2,901,435

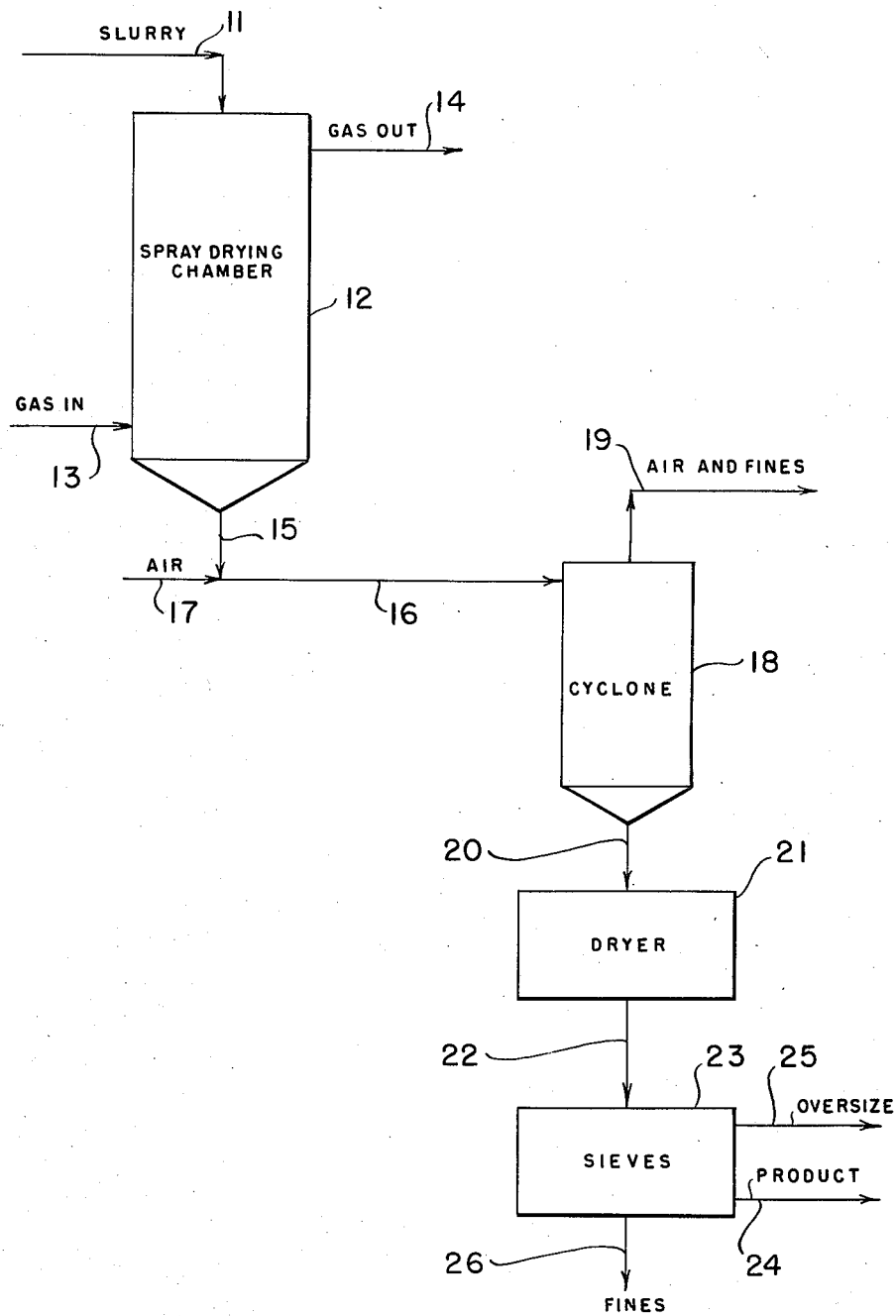

SPRAY DRYING CALCIUM HYPOCHLORITE SLURRY

Homer L. Robson, Lewiston, N.Y., assignor to Olin Mathieson Chemical Corporation, a corporation of Virginia Application April 18, 1955, Serial No. 501,977

8 Claims. (Cl. 252—187)

This invention relates to a rapidly dissolving calcium hypochlorite product, suitable for use in the home laundry and for other purposes. More particularly, it relates to a diluted calcium hypochlorite material which dissolves rapidly in mildly agitated water and which will disperse and sink without formation of lumps in relatively quiet water.

Calcium hypochlorite products have been developed which meet commercial requirements satisfactorily. These materials are adequately stable, and may be dissolved without lumping within a reasonable time when employed by skilled personnel in commercial laundries, canning plants, textile mills and other operations requiring the use of calcium hypochlorites. A product which has been successful in this field contains, for example, 70 to 75 percent calcium hypochlorite, 1.5–2.5 percent calcium hydroxide, 1 to 3 percent calcium carbonate, 0 to 2 percent calcium chloride, 0.5 to 1 percent calcium chlorate, 14 to 20 percent sodium chloride, and 0 to 0.9 percent water. This product is available in several screen fractions as required. One preparation which has been well-received in the laundry trade contains 100 percent of material passing a 30 mesh sieve with 93 to 96 percent retained on a 100 mesh sieve. This product gives good results in commercial equipment, dissolving rapidly without forming lumps when thrown into unstirred water. This material has also been blended with various other materials as required by the trade.

Other calcium hypochlorite preparations available on the market may contain, in addition to calcium hypochlorite, 4 to 20 percent calcium hydroxide, 1 to 5 percent calcium carbonate, 0.5 to 5 percent calcium chlorate and 4 to 10 percent calcium chloride. Those with high calcium hydroxide content in general give poor rates of solution due to the retarding influence of the calcium hydroxide. The other ingredients have less effect on the rate of solution.

Finely ground calcium hypochlorite preparations have been available to the trade for many years. These dissolve very rapidly when thrown into strongly agitated, warm water. However, when added to cold water they may form lumps which frequently dissolve very slowly. When added to unagitated water or water in mild motion, the finely powdered material may float for a few seconds. During that time lumps will form and they dissolve only slowly. Because these finely powdered calcium hypochlorite products frequently result in the formation of lumps, they have lost favor with commercial users and today over 80 percent of the calcium hypochlorite sold is in granular form.

Introduction of bleaches based on calcium hypochlorite into the home laundry trade has shown that the manufacturer or blender has no control over the conditions under which the product may be used. Directions have variously called for first dissolving the bleach in water and adding the solution, or adding the bleach to water which is warm and well agitated or adding the bleach to the agitated water before putting the clothes in to be bleached. Despite any emphasis placed on the importance of following these and other directions, housewives frequently add the dry powder to the laundry machine with the clothes already in the water, with or without agitation. Under these conditions some particles of calcium hypochlorite sink through the unagitated or poorly agitated water and lodge on cloth. They then continue to dissolve while remaining more or less in one position on the cloth on which they have settled. This usually results in locally high concentrations of hypochlorite and, in turn, in "pinholing" which is strongly objected to by the housewife. This damage may not show up for several weeks after the first incorrect use of the bleach. It will usually be blamed for the pinholing although the pinholing would not have occurred had the bleach been applied according to directions.

Concentrations of available chlorine required for proper bleaching of household laundry work may vary from 50 to 500 parts of available chlorine per million parts of water. If the clothes have been washed and rinsed, 50 parts per million of available chlorine will usually be sufficient to bleach stains. If the bleach is added to the first water, along with the detergent, so that all the soil is present, from 200 to 300 parts per million may be required. Some merchandizers of liquid bleach recommend concentrations up to 500 parts per million. While the latter is much more than required to bleach stains on the cloth, most of the bleach is normally consumed by the soil. Thus the available chlorine usually falls to around 100 parts per million in a few minutes and with heavily soiled clothes may fall to zero. Thus the loss in tensile strength is normally not serious. Should this quantity of bleach be used on relatively clean clothes, or on clothes which have been washed and which are re-washed due to some stain or resistant soil, the clothes will be slightly injured by concentrations as high as 500 parts per million. This injury will generally show up as a 1 to 2 percent loss in tensile strength. As a result, tears appear sooner than would be the case if a proper concentration of bleach were employed.

Washing temperatures are usually in the range of 140 to 160° F. At these temperatures serious damage to the cloth occurs when the concentration of available chlorine exceeds about 5000 parts per million. A concentration of 10,000 parts per million, for example, will so weaken the cloth that it disintegrates after perhaps 20 cycles of wear and washing. With concentrations of 20,000 to 30,000 parts per million of available chlorine, damage may be so severe that holes appear within 3 to 10 cycles of wear and washing. Between 1000 and 5000 parts per million, the tensile strength may be lowered. Frequently the cloth may be subjected to normal wear and washing many times, dried and even ironed without injury being apparent. The damage in the form of fine or gross tears may appear during a subsequent washing or drying. If the injury has been confined to a small area, such as $\frac{1}{16}$ or $\frac{1}{8}$ inch, as would be the case if a particle of calcium hypochlorite preparation was caught by the cloth and allowed to dissolve slowly in contact with it, a pinhole may show up after multiple launderings following the injury. Although such holes are referred to as "pinholes," their size may vary from a barely detectable pinhole to as large as $\frac{1}{8}$ inch diameter in some cases. If the calcium hypochlorite preparation is of a type that can form lumps on contact with quiet water or water with only mild agitation, these lumps may lodge in the cloth and damage fairly large areas, running from $\frac{1}{4}$ inch diameter to $\frac{1}{2}$ inch or more.

Calcium hypochlorite dissolves fairly readily to form a solution of 100,000 parts per million when a quantity in excess of its solubility limit is added to agitated water. At saturation the content of available chlorine is considerably higher, from 140,000 to 190,000 parts per million, depending on the other soluble salts in the calcium hypochlorite preparation. Concentrations higher than 50,000 parts per million require unusual situations and are rarely met. Conditions which permit a particle to lodge against cloth and dissolve to form solutions of available chlorine in the range of 1,000 to 20,000 parts per million are provided by the addition of most granular forms of calcium hypochlorite to quiet or mildly agitated water covering cloth.

The use of spray dried particles of soaps and detergents has been found by the industry to give an optimum rate of solution. Particles having a diameter of about 100 to 2,000 microns diameter are preferred. Because of the viscous nature of these materials, spraying produces beads usually having fairly thick walls. Such spray dried detergent particles have minimum apparent densities varying from 0.10 to 0.20 for material of 40 percent active content. Some highly built materials of 15–25 percent active content may have minimum apparent densities in the range of 0.20 to 0.30.

Solutions of calcium hypochlorite have previously been spray dried usually to obtain products having small particle sizes in the range of 10 to 40 microns since decomposition has been lower with such finely divided materials. The product has been light, usually having a minimum apparent density between 0.12 and 0.25 for the final material containing 70 percent available chlorine. With solutions of calcium hypochlorite containing sodium chloride, final products of 30 to 35 percent available chlorine with minimum apparent densities of 0.25 to 0.32 have been obtained. With increased proportions of salt, final products containing about 20 percent available chlorine with densities in the range of 0.3 to 0.37 may be obtained. All of these products are objectionably dusty and must be further processed, for example, by compacting, to give an acceptable product. The water content of these products has generally been in the range of 7 to 15 percent of the available chlorine content, so that further drying has been necessary to make a satisfactory product. Past spray dried products have usually contained 80 percent or more of fines passing a 325 mesh screen. Attempts described in the prior art to produce larger particles have resulted in excessive decomposition, due partly to a higher residual water content of the product.

A slurry for spray drying can be prepared by blending the finest salt available on the market into a filter cake or slurry of calcium hypochlorite dihydrate crystals but the resulting spray dried product is unsatisfactory. The so-called "flour" salt, the finest available on the market, carries from 20 to 35 percent of material coarser than 100 mesh (retained on a screen having 150 micron openings) and normally contains less than 10 percent of material finer than 325 mesh (44 microns). A slurry of such material is readily prepared and sprayed, but the resulting product is not suited for sale as a household product since it is structurally weak and gives rise to objectionable dust on handling. The wall of a bead having a diameter of 400 microns has a thickness of from 7 to 10 microns. This is too fragile to resist the impact of a cubic crystal of salt 50 microns in each dimension. The much heavier and denser particles of salt shatter the beads, producing fines which are dusty and quite objectionable in a product sold for home use. Dust containing calcium hypochlorite is severely irritating to persons who are not accustomed to it. Further, a product containing such thin walled beads and relatively large cubes of sodium chloride will segregate on handling, the heavier salt tending to gravitate to the bottom and the partly broken beads carrying the hypochlorite to the top of the container. There is a further disadvantage in that "flour" salt is too coarse for proper handling through the pressure pumps and valves in spray drying by means of nozzles.

According to the process of the present invention, the salt used is of dimensions commensurate with the expected wall thickness of the spray dried beads. The salt is formed into an aqueous slurry which also contains calcium hypochlorite. This aqueous slurry is spray dried and, to produce a final product which can be suitably stored over a period of time, is subjected to a further drying operation to produce a material of low water content.

In the process the salt particles used become an integral part of the bead wall and, as such, they thicken the wall to approximately 20 or 25 microns thickness where the bead has a diameter of 400 microns, for example. This is in contrast to the 7 to 10 micron wall obtained when a clear aqueous solution of calcium hypochlorite and salt or a thin aqueous slurry having calcium hypochlorite dihydrate as the only solid ingredient is sprayed.

The salt used in preparing the aqueous slurry containing the salt and the calcium hypochlorite should be such that the maximum size of the grains is 30 microns. Furthermore, the salt used in making the slurry should be such that at least 90 percent by weight of the grains does not exceed 25 microns in size and also such that at least 50 percent by weight of the grains does not exceed 15 microns in size. With such finely ground salt, there are practically no free cubes or other particles of sodium chloride which are not attached to calcium hypochlorite particles. Consequently, the salt does not segregate from the calcium hypochlorite and the product remains uniform in composition from top to bottom during shipping and storage. If the salt used contains an excessive amount of particles larger than 25 microns, such large particles may appear as separate particles which are not part of the bead walls. A salt containing minor portions of such large particles can be used. To obtain good results, however, the weight percent of salt coarser than 25 microns is kept below 10 percent.

Ordinary salt grinding and air classifying will not give a fine enough salt. While there may be a large portion of 10 micron material, too many particles will be over 25 microns. This can be corrected by double classification or other special classification treatment. Fluid grinding systems can be set to pass very little material larger than 20 microns. A typical grind with a fluid grinding system would be 25 percent finer than 6 microns, 25 percent of 6 to 10 microns, 25 percent of 10 to 15 microns, 20 percent of 15 to 20 microns and 5 percent or less over 20 microns, all being percent by weight of the grind. Such material would have an average particle size, on a particle basis, of 3.5 microns. This latter dimension may be determined with a Fischer sub-sieve sizer or by means of particle counts.

This invention is not limited to fluid ground salt, or to salt otherwise ground and specially air classified. Salt slurries, for example, can be ground by colloid mill treatment. By classification of the slurry and return of the underflow (oversize) a suitable fineness can be obtained. This slurry then requires thickening prior to use with the calcium hypochlorite slurry or cake. Satisfactory results can also be obtained by passing the combined slurry of calcium hypochlorite and salt through one or a series of colloid mills and spraying the ground slurry without thickening. In this case the capacity is much less than when a classification and thickening scheme is used.

In describing the maximum size of the salt particles, the least dimension is considered. Most particles are nearly equant, but flattened particles will arrange themselves in the bead wall with the flattened surface generally parallel to the wall, if the minimum dimension is commensurate with the bead wall thickness or thinner.

The aqueous slurry of calcium hypochlorite and sodium chloride particles which is spray dried in accordance with this invention should contain a total of about 40 percent to 60 percent by weight of solids, that is, calcium hypochlorite and sodium chloride. The upper limits of solids content depends to a considerable extent on the equipment available and can be raised provided the formation of beads larger than the maximum desired size does not represent an objectionable proportion of the product.

The calcium hypochlorite used in preparing the aqueous slurry can vary widely in available chlorine content, although it will generally be from about 50 to 70 percent. The relative amounts of salt and hypochlorite used in preparing the aqueous slurry can also vary considerably within the scope of the invention, depending on the available chlorine content of the hypochlorite used and the available chlorine content desired in the final product. The latter can have from about 10 to 35 percent available chlorine content. In general:

$$\frac{\text{Weight percent hypochlorite} \times \text{available chlorine (percent in hypochlorite)}}{100}$$

= available chlorine (percent in product)

In actual operation some hypochlorite decomposes in the process and in order to obtain the desired available chlorine content in the product it is usually necessary to use about 5 to 10 percent additional hypochlorite over the calculated amount. The following table shows several examples of the use of the above equation to calculate the proportions theoretically and actually used of salt and hypochlorite to obtain products containing specific proportions of available chlorine from hypochlorite starting materials of higher available chlorine content (dry basis analysis).

| Available chlorine, percent in Hypochlorite | Salt, percent in weight | | Hypochlorite, percent in weight | | Available chlorine in product |
|---|---|---|---|---|---|
| | Theory | Actual | Theory | Actual | |
| 50 | 80 | 79 | 20 | 21 | 10 |
| 50 | 60 | 57 | 40 | 43 | 20 |
| 70 | 50 | 47 | 50 | 53 | 35 |

The aqueous slurry of calcium hypochlorite and salt in the form of a creamy smooth mixture is sprayed through a nozzle. The conditions employed in the spray drying operation do not differ radically from those which have heretofore been used in the spray drying art. Thus, the drier should be of sufficient height to provide the required retention time and free fall. For example, particles which have a diameter of 400 microns require a minimum retention time of approximately 10 seconds. This means that the drier height should be 30 feet or more from the nozzle outlet to the collecting cone at the bottom of the drier. In the process of the present invention, gas temperatures within the drier are higher than those which are normally used to produce hypochlorite particles having a diameter of 10 to 40 microns. With the latter, gas inlet temperatures around 350° F. and gas outlet temperatures of about 160° F. have been favored. With the larger particles produced in accordance with this invention, gas inlet temperatures in the range of about 400 to 450° F. and gas outlet temperatures of about 180 to 200° F. are preferred. Under these more severe conditions the finer particles produced in the spray drying operation are somewhat decomposed, and these are preferably separated and discarded in the manner described below. The retention time of the drying air in the drying chamber is preferably from about 20 to about 40 seconds.

By spray drying the aqueous calcium hypochlorite-salt slurry in the manner described, it is possible to produce satisfactory products having particle sizes as large as 1,000 microns. Usually, however, the spray drying operation will be conducted in such a manner that at least 70 percent by weight of the spray material has a particle size in the range of 100 to 600 microns and, preferably, in the range from 150 to 400 microns.

After the spray drying operation has been performed, the large particles, such as those of 400 micron diameter, will retain considerable moisture and will be warm and decompose rapidly. They are dry enough, however, to have substantially no adhesiveness. They are taken from the cone at the bottom of the drier and are immediately supported in a large volume of cooling air, usually at atmospheric temperature, moving at about 10 to 20 feet per second and are carried to a cylone collector. The inlet velocity of the cyclone collector is advantageously in the range of 15 to 25 feet per second. Higher velocities are likely to result in broken beads and consequent higher content of fines. As collected in the cyclone, the spray dried material will normally have a temperature of less than 130° F. Some additional drying will take place during the period of time when the particles are suspended in the cooling air stream, and this will generally amount to from 10 to 20 percent of the moisture content of the solids leaving the drier.

Preferably the cyclone is so operated that particles of 100 microns and over are collected, and those of 50 microns and smaller are passed through the cyclone. These smaller particles can then be recovered by cyclone collectors of higher inlet velocity or smaller size, or they can be discarded by passing the stream of air and dust leaving the cooling cyclone to a scrubbing system. By making a prompt separation of the fines from the particles of desired size, adhesion of the smaller particles is avoided. This gives a more favorable screen analysis of the final product.

The spray preformed beads still contain too much water for prolonged storage. They are accordingly passed to final drying equipment where the moisture is reduced to an acceptable value, generally below one percent by weight and preferably from about 0.1 to 0.3 percent by weight.

Following this final drying, the particles can be screened, if desired. It is advantageous to separate substantially all of the particles finer than 150 mesh (corresponding to 100 micron diameter). In making this separation, a substantial portion of the particles in the range of 100 to 150 microns can also be separated. Such separation can be effected on a screen having openings of about 150 micron spacing when the loading is sufficient to result in the passage of most of the 100 micron particles while passing about half, for example, of the 135 micron sizes. Any oversize material, resulting from a small portion of the particles adhering together can also be removed, usually by means of a 30-mesh screen (corresponding to 590 micron diameter). The fines separated in such a screening operation are mostly finer than 100 microns diameter and are of lower available chlorine analysis, in comparison with the remainder of the product. However, they can be used, if desired, in the preparation of further quantities of aqueous calcium hypochlorite and salt slurry to be spray dried. In contrast, the fines from the cooling cycle are normally too low in available chlorine to warrant recycle.

By varying the proportion of fine salt to calcium hypochlorite in the slurry, particles having from 10 percent or less to 35 percent or more of available chlorine content can be prepared. For maximum speed of solution and dispersion in lightly agitated water, products containing from 12 to 35 percent available chlorine are preferable. For use in compounding products for the household trade, limited by the Caustic Poisons Act to a content of not over 10 percent available chlorine, spray preformed, dried beads having an available chlorine content of about 12 percent are particularly advantageous. These can be simply blended with a minor proportion of additives to give a suitable final product having, for example, 9.7 percent available chlorine content. Such additives can include compatible surfactants, sequestering agents, buffers and other materials. These will usually comprise from 10 to 20 percent of the total formula. If the additives are small in amount, a suitable diluent can be employed to reduce the final available chlorine content to not over 10 percent. Alternatively, the present process can be adjusted to give an available chlorine content lower than 12 percent. However, for some highly built household bleaches it is desirable to have the hypochlorite component of about 20 percent available chlorine content.

In the attached flow sheet of the process of the present invention a suitable slurry of calcium hypochlorite and salt prepared as described is introduced via line 11 to spray chamber 12. The drying gas, suitably air, is introduced via line 13 and flows countercurrently to the particles and leaves via line 14. The spray dried particles collect in the bottom of chamber 12 and fall via line 15 into a duct 16 which is supplied by cooling air via line 17. The spray dried product is thus transferred to cyclone separator 18 from which the air and fines are removed via line 19. The beads are discharged from the cyclone via line 20 to vacuum drier 21. The product is removed from the drier 21 and transferred as illustrated by line 22 to sieves 23. The product is removed from certain of these sieves as illustrated by line 24. Oversize and fines are removed as illustrated by lines 25 and 26 respectively and returned to the slurry-forming step.

*Example*

A filter cake containing calcium hypochlorite dihydrate as the principal ingredient was used as starting material. This contained 45 percent of water and 45 percent of calcium hypochlorite, the balance consisting of dissolved sodium chloride and one to two percent of calcium hydroxide, calcium carbonate and other insolubles. 200 pounds of the filter cake was blended with 225 pounds of finely ground salt, adding about 175 pounds of water to make a smooth slurry. The salt contained about 5 percent by weight of particles coarser than 20 microns with no particles coarser than 30 microns and about 53 percent by weight finer than 10 microns.

This slurry was pumped to a spray nozzle located in the top of a spray chamber at a rate of about 9.0 pounds per minute. The spray chamber was 6 feet in diameter and 40 feet in height. Air at the rate of 40 cubic feet per second entered at the bottom at 425° F. and the exit gas exhausted at the top was at 192° F. The spray dried beads, containing about 10 percent moisture, collected in the cone bottom of the drying chamber and dropped through a slot 6 inches by 3 inches into a stream of air entering at 70° F. and moving at a rate of about 3 cubic feet per second. The air stream conveyed the beads through a duct 6 inches by 4½ inches to the inlet of a short form cyclone having an inlet velocity of 25 feet per second. The gases leaving the cyclone carried considerable fine material and were passed through a wet gas scrubber and discharged. About 4 pounds per minute of beads at 100° F. and containing about 10 percent of water were discharged from the cyclone.

The dried and cooled beads were placed on trays and charged to a shelf drier where they were dried under an absolute pressure of 20 millimeters of mercury for two hours. The shelves were heated by closed coils with steam at 5 pounds gauge pressure. This resulted in a product containing 0.05 to 0.10 percent of water and 21 percent of available chlorine. The product has a minimum apparent density of about 0.45 and disperses satisfactorily when thrown on water. The product was screened, obtaining 122 pounds of product passing 30 mesh but retained on 150 mesh U.S. Standard screens. The oversize and fines from the screening operation were returned to the slurry-forming step of the process.

I claim:
1. A method for the preparation of a calcium hypochlorite composition which comprises preparing an aqueous slurry totaling about 40 percent to 60 percent by weight of calcium hypochlorite and sodium chloride grains, the sodium chloride grains having a maximum size of 30 microns, with at least 90 percent by weight of the sodium chloride grains less than 25 microns and at least 50 percent by weight of the sodium chloride grains less than 15 microns, and spray drying the aqueous slurry to provide particles not exceeding 1,000 microns maximum size.

2. A method according to claim 1 in which the aqueous slurry is spray dried to provide a spray dried product containing at least 70 percent by weight of particles in the 100 to 600 micron size range.

3. A method according to claim 1 in which the aqueous slurry is spray dried to provide a spray dried product containing at least 70 percent by weight of particles in the 150 to 400 micron size range.

4. A method according to claim 1 in which the spray dried product is further dried to provide a composition having a water content below about one percent by weight.

5. A method according to claim 4 in which the product thus dried is screened to provide a final product in the 100 to 590 micron size range.

6. A method for the preparation of a calcium hypochlorite composition which comprises preparing an aqueous slurry totaling about 40 percent to 60 percent by weight of calcium hypochlorite and sodium chloride grains, and spray drying the aqueous slurry to provide particles not exceeding 1000 microns maximum size, the said sodium chloride grains having a maximum size commensurate with the wall thickness of the spray dried particles.

7. A method for the preparation of a calcium hypochlorite composition which comprises preparing an aqueous slurry totaling about 40 percent to 60 percent by weight of calcium hypochlorite and sodium chloride grains, the sodium chloride grains having a maximum size of 30 microns, with at least 90 percent by weight of the sodium chloride grains less than 25 microns and at least 50 percent by weight of the sodium chloride grains less than 15 microns, introducing the aqueous slurry into a spray drier having a gas inlet temperature of from 400° to 450° F. and a gas outlet temperature of from 180° to 200° F., and therein subjecting the aqueous slurry to spray drying to provide spray-dried particles not exceeding 1,000 microns maximum size.

8. A method according to claim 7 in which the aqueous slurry is spray dried to provide a spray dried product containing at least 70 percent by weight of particles of 150 to 400 micron size.

References Cited in the file of this patent

UNITED STATES PATENTS

| 1,787,048 | MacMullin et al. | Dec. 30, 1930 |
| 2,308,992 | Mertens | Jan. 19, 1943 |
| 2,319,697 | MacMahon | May 18, 1943 |
| 2,446,869 | Cunningham | Aug. 10, 1948 |
| 2,587,071 | Sprauer | Feb. 26, 1952 |
| 2,590,764 | Robson | Mar. 25, 1952 |
| 2,657,797 | Ledgett | Nov. 3, 1953 |

FOREIGN PATENTS

| 319,727 | Great Britain | May 29, 1930 |